United States Patent [19]

Chapman

[11] Patent Number: 5,318,313
[45] Date of Patent: Jun. 7, 1994

[54] CAMERA DALLY AND PEDESTAL

[75] Inventor: Leonard T. Chapman, North Hollywood, Calif.

[73] Assignee: Leonard Studio Equipment, Inc., North Hollywood, Calif.

[21] Appl. No.: 761,179

[22] Filed: Sep. 16, 1991

Related U.S. Application Data

[63] Continuation-in-part of Ser. No. 591,525, Oct. 1, 1990, Pat. No. 5,157,700.

[51] Int. Cl.⁵ .................................................. B62B 3/02
[52] U.S. Cl. ............................... 280/47.11; 248/129; 254/423; 280/91; 280/99
[58] Field of Search ..................... 280/47.11, 100, 99, 280/91; 248/129; 254/423 VA

[56] References Cited

U.S. PATENT DOCUMENTS

| | | | |
|---|---|---|---|
| 4,003,584 | 1/1977 | Zelli | 280/47.11 |
| 4,111,389 | 9/1978 | Gundlach et al. | 248/162 |
| 4,300,782 | 11/1987 | Pioth | 280/47.11 |
| 4,337,845 | 7/1982 | Zelli et al. | 187/17 |
| 4,577,827 | 3/1986 | Eliscu | 248/656 |
| 4,657,267 | 4/1987 | Jaumann et al. | 280/47.11 |
| 4,697,773 | 10/1987 | Jaumann et al. | 248/162.1 |
| 4,950,126 | 8/1990 | Fabiano et al. | 280/47.11 |
| 5,028,037 | 7/1991 | Wang | 267/64.13 |

FOREIGN PATENT DOCUMENTS 753997 10/1933 France ........................... 280/47.11

OTHER PUBLICATIONS

Ladybird Elemack Brochure.
Vinten Complete Range Catalogue 1989/1990.
Cricket Camera Dolly Brochure.
FGV Panther Brochure.
Vinten Tri-Track photographs.
Photographs: Vinten Tri-Track Pedestal.

*Primary Examiner*—Eric Culbreth
*Attorney, Agent, or Firm*—Lyon & Lyon

[57] ABSTRACT

A camera pedestal has a cylinder with a tapering cross-section for providing a uniform counterbalancing force using a compressed gas. Telescoping column sections which make up a column assembly have inner relief channels and outer slots for hardened roller strips. A column drive system has a motor driving a gear engaged to a rack on the column, to automatically or remotely raise or lower the column. A column braking system locks the column assembly into any selected position and prevents extension or retraction of the column assembly if the load on the column is not counterbalanced by the compressed gas. The column assembly is eccentrically positioned on its base tank. The pedestal is engageable to a receptacle on a camera dolly with a telescoping steering drive tube interconnecting a steering assembly on the pedestal with a steering system in the dolly.

8 Claims, 10 Drawing Sheets

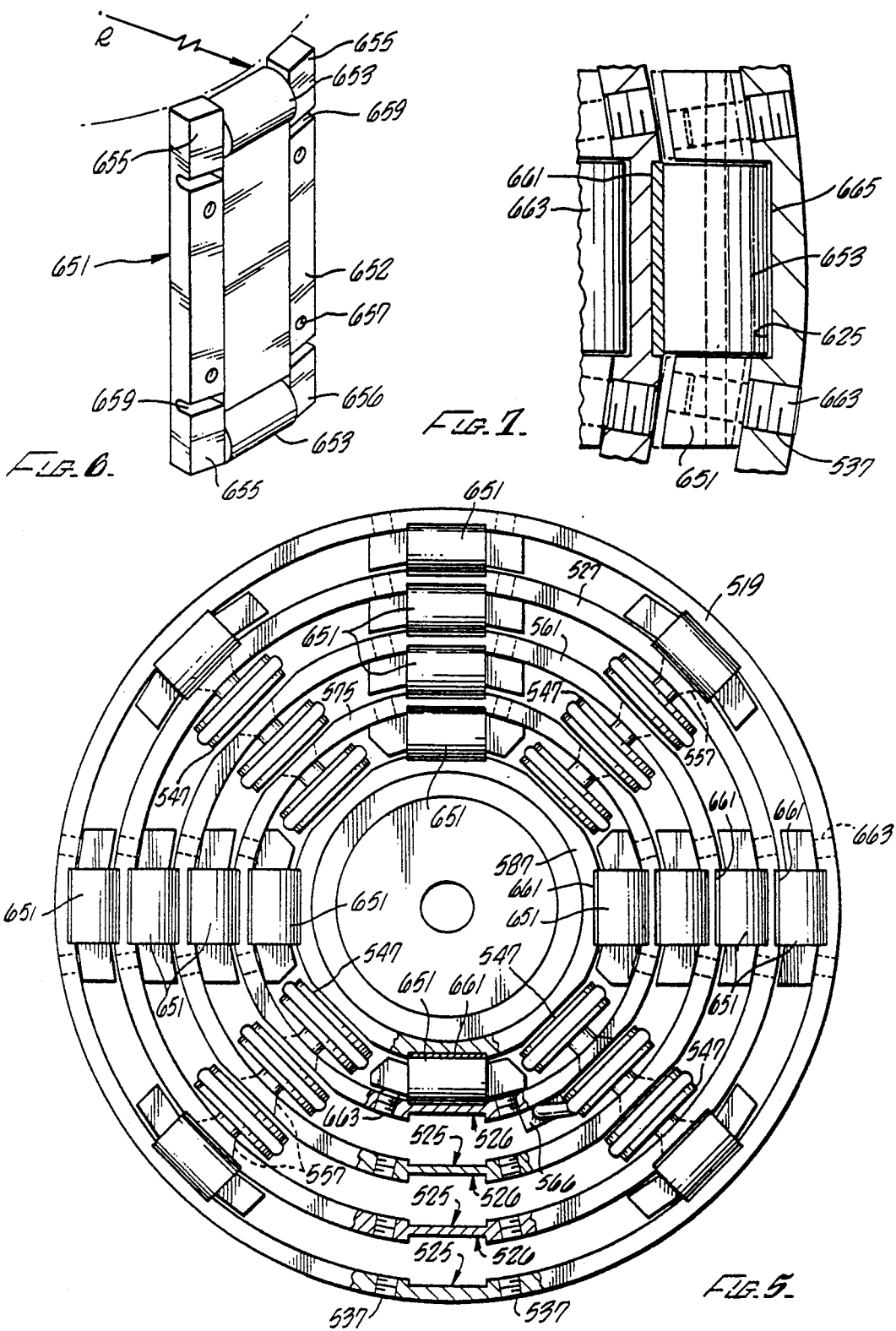

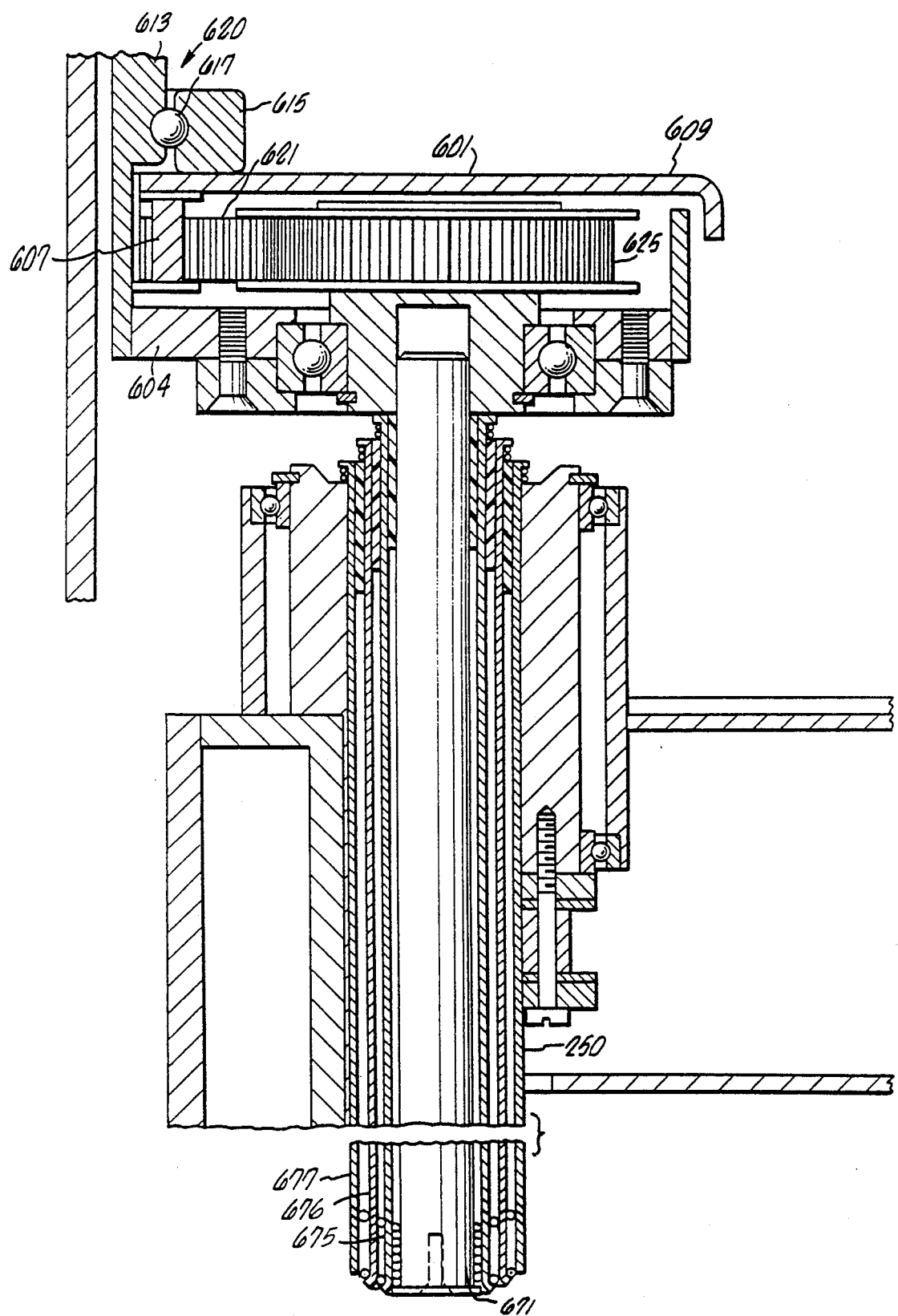

CAMERA DALLY AND PEDESTAL

CROSS REFERENCE TO RELATED APPLICATION

This is a continuation-in-part of U.S. patent application. Ser. No. 591,525 filed Oct. 1, 1990 and now U.S. Pat. No. 5,157,700. The disclosure of my application Ser. No. 761,168 filed concurrently with this application, and Ser. No. 591,524 now U.S. Pat. No. 5,174,593, are incorporated herein by reference.

BACKGROUND OF THE INVENTION

The field of the invention is telescoping columns.

Video, television, and motion picture cameras must often be positioned in a particular way for a video or film sequence. The camera must also often move or sweep in azimuth or elevation, and the entire camera may need to be translated or moved over the ground surface, e.g., to follow an action sequence or obtain a desired cinematographic effect. The camera may also have to be elevated or lowered at certain times.

Generally, all movement of the camera must be uniform and smooth without any bumping, rocking, tilting, vibration or other movement that will cause the recorded images to jump when viewed on a screen. For film sequences where the camera remains stationary, a simple support, e.g., a tripod may be sufficient. When the camera must be moved while operating, more sophisticated camera supports are required.

Ideally, the camera support should be lightweight and easily portable; capable of handling a wide range of loads; and support or move the camera with an absolute minimum of noise, vibration, rocking, tilting, jarring, etc. Depending on its specific application, the camera support may also need to be compact so that it may be used in cramped spaces.

Mobile and stationary camera pedestals are commonly used in television productions. These pedestals allow the camera to be raised and lowered and turned or swept (in azimuth). A tilt or elevation feature may also be included. These mobile units generally have three sets of paired wheels forming a three point support.

Within the pedestal, a mechanism for smoothly and quietly raising and lowering the camera platform is required. A purely manual system is generally insufficient since the weight of the camera may be substantial and the combination of inertia, friction and the application of the lifting or dropping force by hand will not ordinarily provide the necessary smooth, quiet and accurate positioning. Consequently, counterbalancing or compensation systems have been provided in camera pedestals to compensate for the weight of the camera and facilitate cinematographically acceptable changes in camera height or elevation. For example, Galione, U.S. Pat. No. 4,094,484 describes a pedestal having a self pumping action which provides a counterbalancing force by using compressed gas. Nakazawa et al, U.S. Pat. No. 4,757,970, discloses a television camera pedestal using constant torque springs to compensate for the camera weight. While these and other camera pedestals may have met with varying degrees of technical or commercial success, various disadvantages remain. For example, no known camera pedestal has a compressed gas compensation system which provides a uniform counterbalancing force throughout the full extension of the pedestal column. In addition, mechanical or spring actuated counterbalancing or compensation systems in pedestals are relatively complex and may be noisy in operation and difficult to set for a particular camera weight. These known pedestals also typically generate perceptible noise, especially during quick movements. In addition, they ordinarily have a limited range of movement or may tend to drift or sink from a desired position.

It is advantageous in filming or shooting to be able to position the camera to a very low position. This requires relatively short column sections in telescoping type pedestals. On the other hand, to also have a sufficient maximum height, a relatively large number of column sections is required, heretofore making for a bulky pedestal.

Accordingly, it is an object of the invention to provide an improved camera pedestal which has uniform camera weight compensation throughout the full extension of the pedestal.

It is a further object of the invention to provide such a camera pedestal which is configured for ease of use and is compact yet offers exceptionally low camera positions while still having a large elevation range.

It is yet another object of the invention to provide such a camera pedestal which can be mounted in, and which has an exceptionally quiet steering assembly which can engage and operate a steering system of, a camera dolly. Other and further objects and advantages will appear hereinafter.

SUMMARY OF THE INVENTION

To these ends, an adjustable camera pedestal includes a column with a hollow tapered drive cylinder having a round cross section area which uniformly expands from the bottom of the cylinder to the top of the cylinder. A piston slidably displaceable within the cylinder has a seal which seals the piston against the inner drive cylinder walls throughout the entire stroke of the piston. A first column section is attached to the piston. A tank with a volume $V_t$ is fillable with a pressurized gas, e.g., compressed nitrogen, and is connected to the drive cylinder which has a volume $V_c$. Where the lower end of the cylinder has a circular cross-section area $A_1$; the upper end of the cylinder has a cross-section $A_2$; the initial gas pressure is $P_i$ and the final gas pressure is $P_f$, the relationship of the areas, volumes, and pressure is $$P_i A_1 = P_f \left( \frac{V_t}{V_t + V_c} \right) A_2.$$

With this relationship, the compensating force acting on the piston remains constant through the stroke of the piston in the drive cylinder. This occurs because even though the gas pressure within the tank and cylinder drops slightly as the piston moves up in the cylinder due to an increase in volume, the area on the piston face on which the gas pressure exerts force increases by a corresponding amount. Consequently, whether the pedestal is near the top or bottom of its range of positions, the compensating force remains the same. This prevents the camera mounted on the pedestal from "drifting" up or down due to an inexact compensating force, i.e., the camera will generally remain substantially exactly as it has been vertically positioned. Preferably, the seal between the piston and cylinder is an expandable O-ring secured about the piston with teflon backup rings to prevent extrusion into the linearly increasing circular gap caused by the taper.

To enable the camera pedestal to position the camera at a low position near the floor, a column support extends at least partially through the tank and four displaceable and relatively short column sections are used. A through cylinder projects below the tank to permit the column assembly of the pedestal to achieve very low positions. The tank is generally hemispherical with a flat round top deck surface, to mate and lie co-planar with a deck surface of a camera dolly in which the pedestal can be mounted. The column assembly is eccentrically positioned to one side of or to the back of the tank for improved ergonomics.

Cables and pulleys are provided on the column sections to facilitate uniform extension and contraction of the column sections. The relative extension of each column section is equal to that of the absolute value of the extension of the next lower column section. The absolute value of the movement of the uppermost or fourth column section is 4 times the extension of the bottom or first column section.

A combination dolly/pedestal camera support includes a dolly having a chassis with a pedestal receptacle, 4 legs pivotally attached to the dolly chassis and having dual sets of wheels extending from each leg on which the dolly rolls. A pedestal having a compressed gas tank and a column assembly joined to one side of the gas tank is supportable in the pedestal receptacle on the dolly. A steering wheel on the pedestal assembly can be linked to a steering system in the dolly. The front legs of the dolly can be laterally extended from the dolly chassis, and the rear legs brought close together, to simulate a 3-point suspension. Resilient tires on the dolly can absorb small protrusions or depressions in the floor or supporting surface for additional stability. The dolly legs can be placed in other configurations to provide a mobile dolly/pedestal unit adaptable to varying requirements, e.g., running on track or passing through narrow openings. Varying the leg positions varies the "tilt line" of the dolly/pedestal unit, i.e, the perpendicular distance from the support points to the center of gravity. Within a given space the 4 corner concept provides better "tilt line" performance compared to the 3 corner configuration.

BRIEF DESCRIPTION OF THE DRAWINGS

Other objects and features of the present invention will become apparent from the following detailed description taken in connection with the accompanying drawings. It is to be understood, however, that the drawings are designed for the purpose of illustration only and are not intended as definition of the limits of-the invention.

In the drawings, wherein similar reference characters denote similar elements throughout the several views:

FIG. 5 is a top view in part section of the column assembly with the structural shields removed;

FIG. 6 is a perspective view of the roller blocks shown in FIG. 5;

FIG. 7 is an enlarged section view fragment of the roller blocks shown in FIG. 5;

FIG. 9 is an enlarged section view fragment of the pedestal steering assembly;

FIG. 17 is an enlarged perspective view fragment of the present column drive system mounted on the column;

DETAILED DESCRIPTION OF THE DRAWINGS

Figure 1:
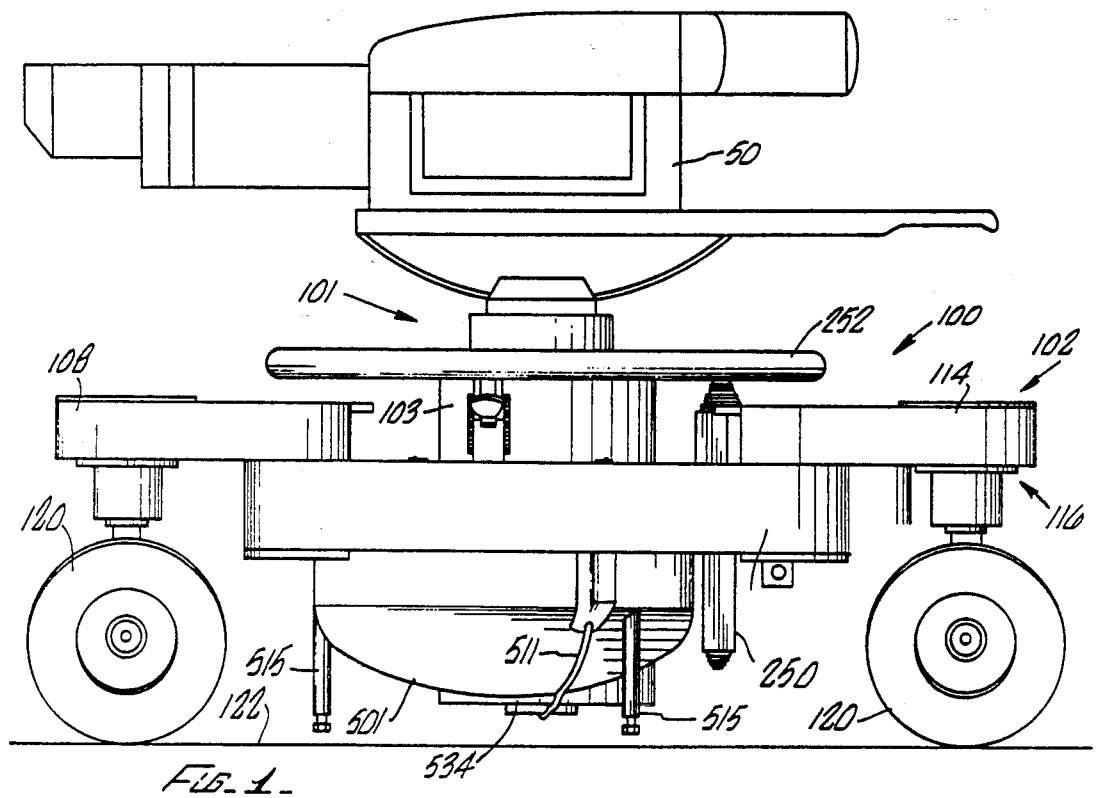
FIG. 1 is a side elevation view of the present camera pedestal installed in a camera dolly.

As shown in FIG. 1, a video, television, or motion picture camera 50 is mounted on top of a pedestal 101 having a steering wheel 252, telescoping steering drive tube 250 and a column assembly 103. The pedestal 101 is mounted on a dolly 102 having a chassis 104 with four articulating legs including left side legs 108 and 114. Wheels 120 are attached to the legs and roll on the floor or ground surface 122 or on track rails.

Figure 2:
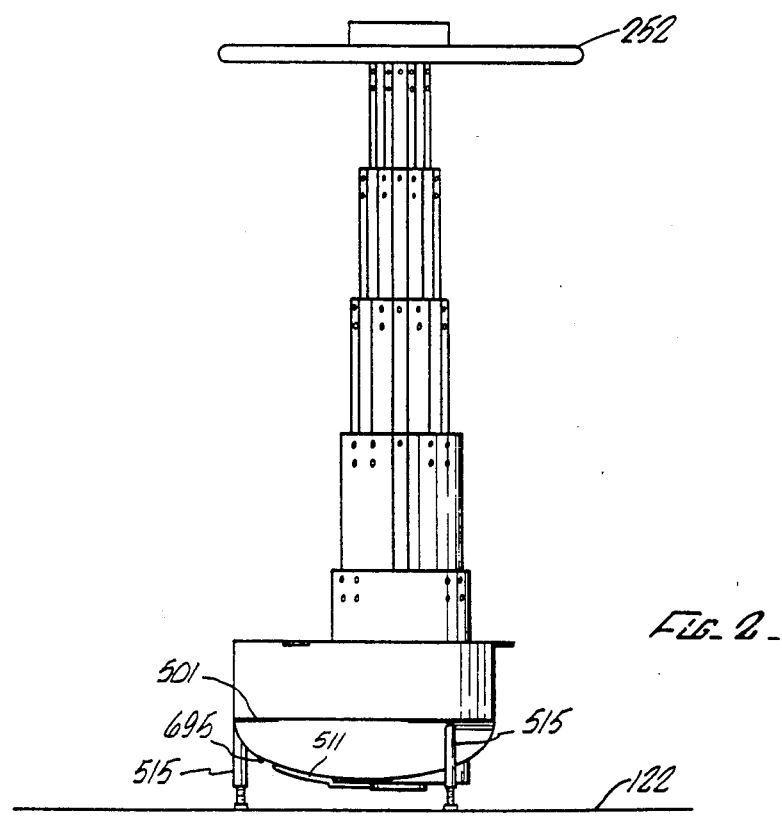
FIG. 2 is a perspective view of the pedestal.

As shown in FIG. 2, the pedestal 101 can be removed from the dolly 102 and stand on its own three legs 515, which are threadably adjustable in length. The pedestal can raise and lower the camera 50. A separate turret placed on top of the pedestal provides panning and tilting movements. When the pedestal 101 is used as shown in FIG. 2, the steering drive tube 250 is disconnected and remains with the dolly 102.

Figure 3:
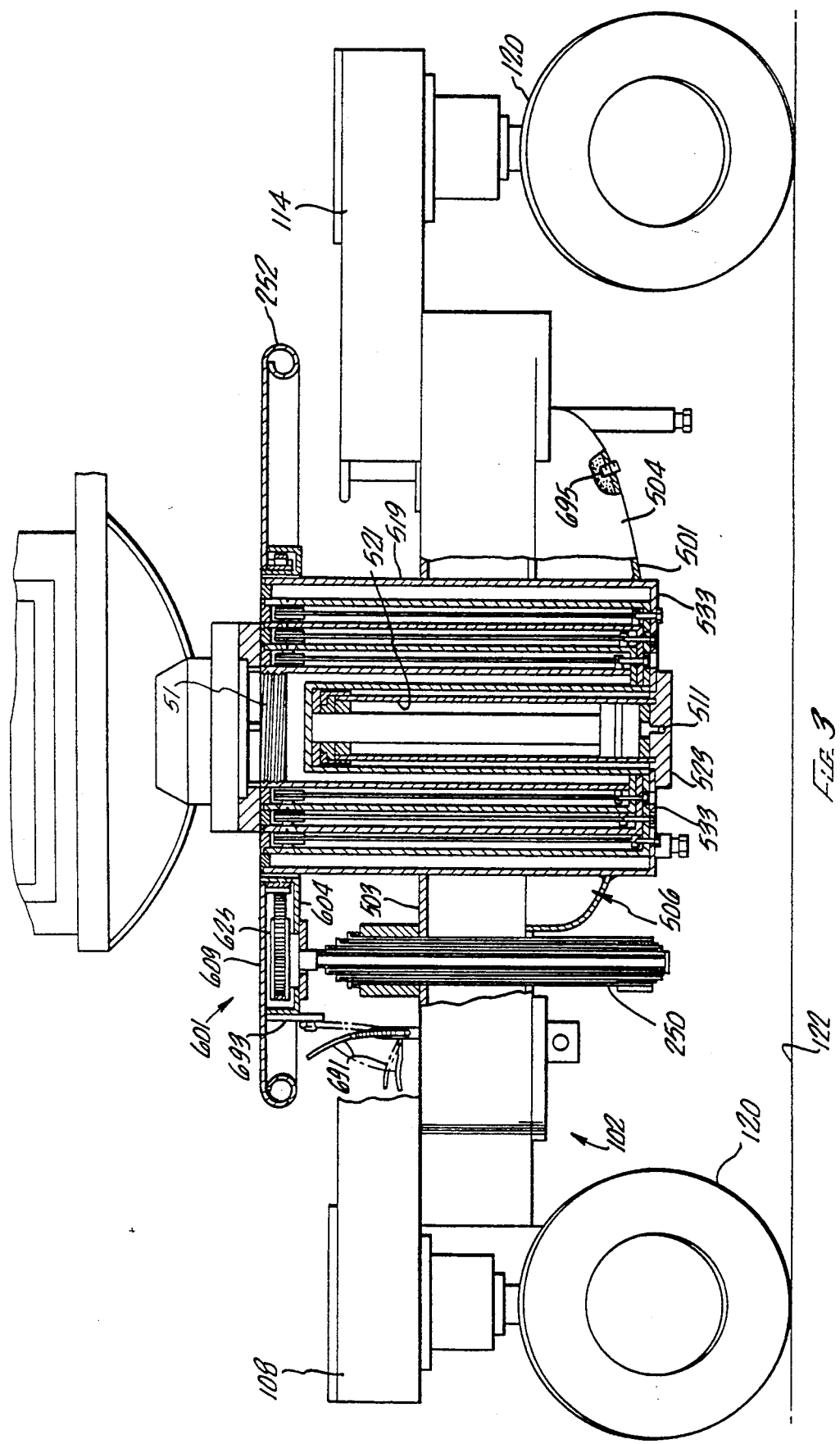
FIG. 3 is a side elevation view in part section of the pedestal as mounted in a dolly.
Figure 4:
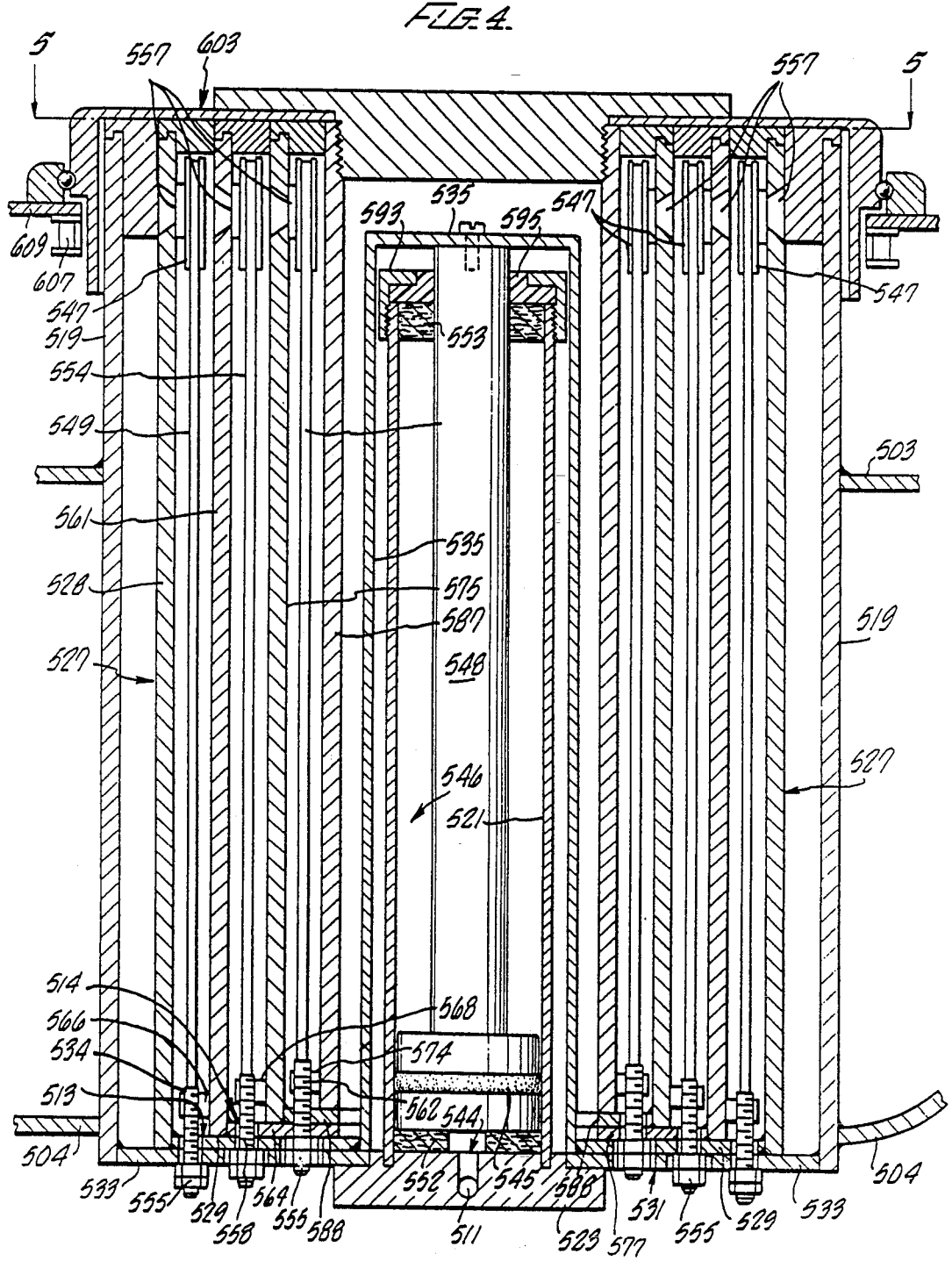
FIG. 4 is a side view fragment in part section of the column assembly of the pedestal.

Referring to FIGS. 3 and 4, the pedestal 101 is provided with a camera mounting plate 51. A pedestal tank weldment 501 has a flat tank deck 503 and a generally hemispherical tank body 504. A column support 519 is generally cylindrical and has a circular plate column support base 533. The column support 519 is welded to the tank deck 503 and tank body 504 and is an integral part of the tank weldment 501 which forms a gas-pressure-tight container.

As shown in FIG. 4, centrally located within the column support 519 is a drive cylinder 521 having an bottom end cap 523. The drive cylinder 521 has a round cross section which uniformly tapers outwardly from the lower end of the cylinder 521 to the upper end thereof. In a preferred embodiment, the drive cylinder 521 is approximately 12 inches long with a base diameter of 2.250 inches linearly increasing to a diameter of 2.263 inches at its top. This increase in the drive cylinder bore or diameter compensates for decreasing gas pressure as the pedestal is elevated, as described further below. The drive cylinder tapered diameter can be increased for additional load carrying capacity. The amount of taper can be selected for corresponding tank volumes.

A piston 543 having a seal 545 is axially slidable or displaceable within the drive cylinder 521. A gas lead tube 511 connects the tank volume 506 to the drive chamber 544 below the piston 543. The ambient chamber 546 above the piston 543 in the drive cylinder 521 is vented to the outside environment. The seal 545 is preferably an O-ring PRP 568-033. This "O"-ring has reduced volume so the sealing forces are less, to reduce friction. The "O"-ring size can be varied somewhat by selecting appropriate groove dimensions. The O-ring maintains a seal between the piston 543 and the drive cylinder 521 along the entire stroke through the drive cylinder 521, e.g., the seal 545 seals against both a 2.2500 bore and a 2.2630 bore. Felt or other soft shock absorbing material end stops 552 and 553 are provided at each end of the cylinder bore 521 to quiet and cushion the movement of the piston 543 at the lower and upper ends of the drive cylinder 521. FIG. 4 shows the piston 543 at its bottom position resting against the lower felt end stop 552. Only the tank 506, lead tube 511, and the variable volume drive chamber 544 (which are all interconnected) contain pressurized gas.

A first column section 527 has a core cylinder 535 secured to the top of a drive rod 548 attached to the piston 543. The outer walls 528 of the first column section 527 are joined to the core cylinder 535 by an annular first column section base 529. The first column section base 529 may be welded to the tubular outer walls 528 and core cylinder. The bottom surface of the first column section base 529 rests within the fixed column support 519 when the column assembly 500 is in the down or collapsed condition. A second column section 561 has an integral base 577 and is nested concentrically within the first column section 527. Similarly, a third column section 575 having an integral third column section base 588 is nested within the second column section 561, and a fourth or top column section 587 (without a base) is nested within the third column section 575. In a preferred embodiment, the column support 519 is 10.0 inches in diameter and the first, second, third and fourth or final column sections are respectively 8.50, 7.00, 5.50 and 4.00 inches in diameter. However, it should be noted that although their sizes are described in terms of a diameter, the first through fourth column sections are somewhat octagonal, rather than purely round, as shown in FIG. 5.

A cylinder end cap 593 is threaded onto the upper end of the drive cylinder 521. A bushing 595 held in place by the cylinder end cap 593 slidably supports the drive rod 548. A steering frame assembly 603 is rigidly attached to the final column section 587 only. The steering frame assembly 603 is not connected to the other sections although it may rest on top of the ends of the other column sections with the column in the collapsed or down position as shown in FIG. 4.

Referring to FIGS. 4 and 5, pulleys 547 are attached to the inside surfaces of the first, second and third column sections 528, 561 and 575 by flathead pulley mounting bolts 557. The pulley mounting bolts 557 have countersunk heads and engage threaded bearing centers within the pulleys 547. A first section cable 549 has a cable stud 534 extending through clearance holes 513 in the first column section base 529 and in the column support base 533 and is secured by lock nuts 555. The first column section cable 549 passes over the pulley 547 attached near the top of the first column section 528 and terminates in a block 566 attached to the outer surface of the lower end of the second column section 561.

Similarly, a second column section cable 554 has an end stud 556 which passes through clearance holes 514 in the bases 577 and 529 and 533 of the first and second column sections and the base. Lock nuts 555 secure the end stud 556 to the base 529 of the first column section, i.e., they prevent the stud end 556 (and all of the stud ends) from pulling out of the base 529. The second column section cable 554 passes over a pulley 557 on the top of the second column section 561 and terminates in a block 568 attached to the outside surface of third column section 575, adjacent its base.

Similarly, a third column section cable 560 has a stud end 562 passing through the second and third column section bases 577 and 588 and secured by lock nuts 555 to the base 577. Similar to the other column sections, the third column section cable 560 passes over a pulley 557 on the inside wall of the third column section 575 and terminates in a block 572 attached near the lower end of the fourth column section 587. The fourth column section 587 has no base or end surface and is similar in shape to an octagonal tube.

FIG. 4 being a cross section illustrates two pulley end cable systems for each column section. However, as is shown in FIG. 5, each column section has four pulley/cable assemblies.

The cables may be terminated in the blocks by passing the cable end through a hole in the block and crimping a sleeve over the cable to prevent it from pulling through the hole in the block. The lock nuts 555 are used for adjusting the preset in the cables and to secure the stud ends of the cables into the bases. Clearance holes are provided through the base of the column support 519 around the lock nuts 555 on the stud ends of the second and third column section cables.

Referring to FIG. 5, the column support 519 preferably has eight inner roller channels 525 equally spaced around its circumference, i.e., at 45° intervals. The fourth column section 587 has four outer roller slots 526 equally spaced around its outside surface. The first, second and third column sections 527, 561 and 575 have both inner roller channels 525 and outer roller slots 526 radially aligned with and partially overlying their inner roller channels 525, and also aligned with the roller channels in the column support 519 and fourth column section 587. The inner roller channels 525 may be broached or milled in a scallop shape. Outer slots 526 (which may be broached or milled with a channel cross-section) extend along the length of the four column sections and the column support. Inner channels 525 need only be long enough to accommodate the rollers 653.

Referring to FIGS. 5, 6 and 7, equally spaced between the pulleys 557 are roller blocks 651, i.e. with four roller blocks in between each column section. For improved rigidity, 8 equally spaced roller blocks may be used at the highest stress interface between the column support 519 and the first column section 527. Each roller block 651 has a body 652 and rollers 653 mounted on a pin 666 between mounting tabs 655. Four threaded roller block mounting holes 657 are provided in the body 652. Adjustment slots 659 are provided at the base of each mounting tab 655, to allow for a small amount of flexing of the tabs 655 for adjustment of the engagement of the rollers 653 during assembly. Each roller block body 652 is radiused on its inner and outer surfaces to match the specific position the roller block will occupy and the column assembly. As shown in FIG. 5, the roller blocks 651 are provided with four different curvatures R. The rollers 653 have an internal bearing which mounts on the pin 666 extending through the mounting tabs 655. A hardened steel strip or runner 661 is secured into the outer roller slots 526 by a single fastener at the top of each of the roller slots. The other or bottom end of the strip 661 is held into the slot 526 (after assembly) by the rollers 653.

Referring now to FIG. 7, the roller blocks 651 are tightly screwed or bolted onto their respective column sections through the threaded mounting holes 657, at the top end of each column section or the column support. The roller block bodies 652 are bolted into position over the slots in the column sections and act as stiffening members. Set screws 663 are then progressively adjusted around the column assembly 500 forcing the mounting tabs 655 to flex slightly inwardly to adjust the rolling engagement of the rollers 653 against the strips 661 in the adjacent section. The rollers 653 roll only on the strip 661. A small gap 665 separates the back of the rollers 653 from the inner roller channels 525. By providing the inner channels 525 and outer slots 526 respectively, relatively large size rollers 653 may be used without requiring an excessively large diameter column assembly. The relatively large size of the rollers 653 provides a quiet and smooth operation as well as a highly rigid column assembly operable in minimal space.

For clarity of illustration, the roller blocks 651 are not shown in FIG. 4, although they are located at the top ends of the column sections in between the rollers, as shown in FIG. 5.

Figure 11:
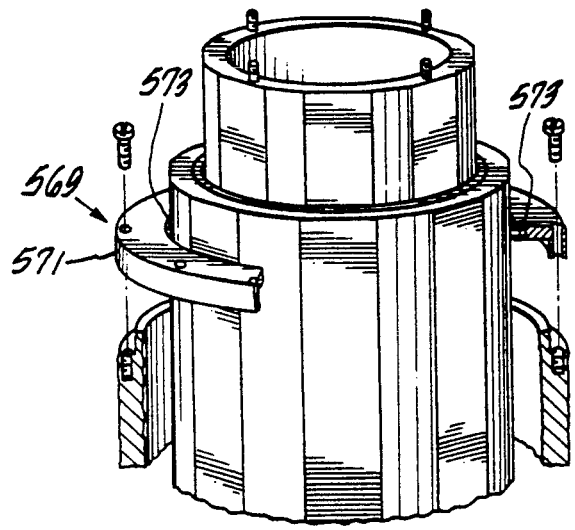
FIG. 11 is a perspective view of a structural shield positioned in between column sections of the pedestal.

Referring to FIG. 11, to increase the stiffness of the column assembly, and to cover over the interstitial openings between the column sections, annular structural shields 569 are provided in between the column sections. A mounting ridge 571 on the structural shields 569 supports and prevents deflection under load of the column sections upper edges. Felt wipers 573 on each structural shield 569 rub against the strips 661 as the column assembly moves, to keep the strip clean and further dampen any vibration.

Referring to FIGS. 3, 4, 8 and 9, a steering wheel assembly 601 includes a steering frame chassis 603. A steering wheel plate 609 having a rubber coated steering rim or wheel 252 is attached to an outer bearing race frame 615 and a steering sprocket 607. The steering wheel may be round or ovular. An oval shaped steering wheel allows the camera support to maintain a narrow profile for passing through narrow doorways, etc., but also provides the operator or grip with an increased wheel radius for control and pushing. The plate 609 is attached to the frame chassis 603 through an inner bearing frame section 613 on the frame chassis 603. The steering frame chassis 603 is rigidly attached to the fourth column section 587, and consequently cannot rotate. The steering wheel plate 609 carrying the steering wheel 252 and the steering sprocket 607 is rotatable with respect to the steering frame chassis 603 by virtue of the bearing 620 formed by the outer bearing race frame 615, the inner bearing frame section 613 and balls 617, preferably made from nylon for increased noise reduction in operation. Rather than fill the entire bearing 620 with nylon balls, a combination of teflon spacers and nylon balls may be used.

The spacer in the bearing is preferably a teflon o-ring section that slides in the race formed by the bearing frames 613 and 615. This reduces the number of balls required in this relatively large diameter bearing and provides good bearing efficiently for handling intermittent fast spin or rotation. The rolling surfaces on frames 613 and 615 are ground polished.

A lower cover plate 604 is attached to the frame chassis 603. Rotatably mounted on the lower cover plate 604 is an idler sprocket 623 (FIG. 8) and a steering drive sprocket 625. A steering drive belt, preferably a Gates Rubber Co. POLYCHAIN GT toothed belt drivingly loops around and engages the steering sprocket 607, idler sprocket 623 and the steering drive sprocket 625. Accordingly, when the steering wheel 252 is turned, the steering sprocket 607 turns with it and thereby turns the steering drive sprocket 625. The steering sprocket 607 preferably has 112 teeth and may be a Gates 8M 112 sprocket with the steering drive sprocket 625 having 28 teeth, e.g., a Gates 8M 28 sprocket. If the pedestal 101 will be used with the camera dolly 102, the sprockets 607 and 625 must be selected in coordination with the steering system of the dolly, to maintain angular correspondence between movement of the steering wheel 252 and the dolly wheels, i.e., so they rotate the same number of degrees.

Referring specifically to FIG. 9, the telescoping steering drive tube assembly 250 comprises four nested square tube sections 671 (a square bar), 675, 676 and 677 (square tubes) with rubber o-rings provided between the sections. These sections may alternatively be separated by Teflon spacer inserts and have open cell neoprene stops between the sections for damping or other suitable material. The sections 671, 675, 676 and 677 slide in a telescoping manner to follow the vertical movement of the steering wheel assembly 601 as column is raised and lowered. In the embodiment shown in FIG. 9, the four sections of the telescoping steering drive tube assembly 250 do not necessarily extend uniformly or progressively, as do the column sections.

Figures 12, 13, 14, 15:
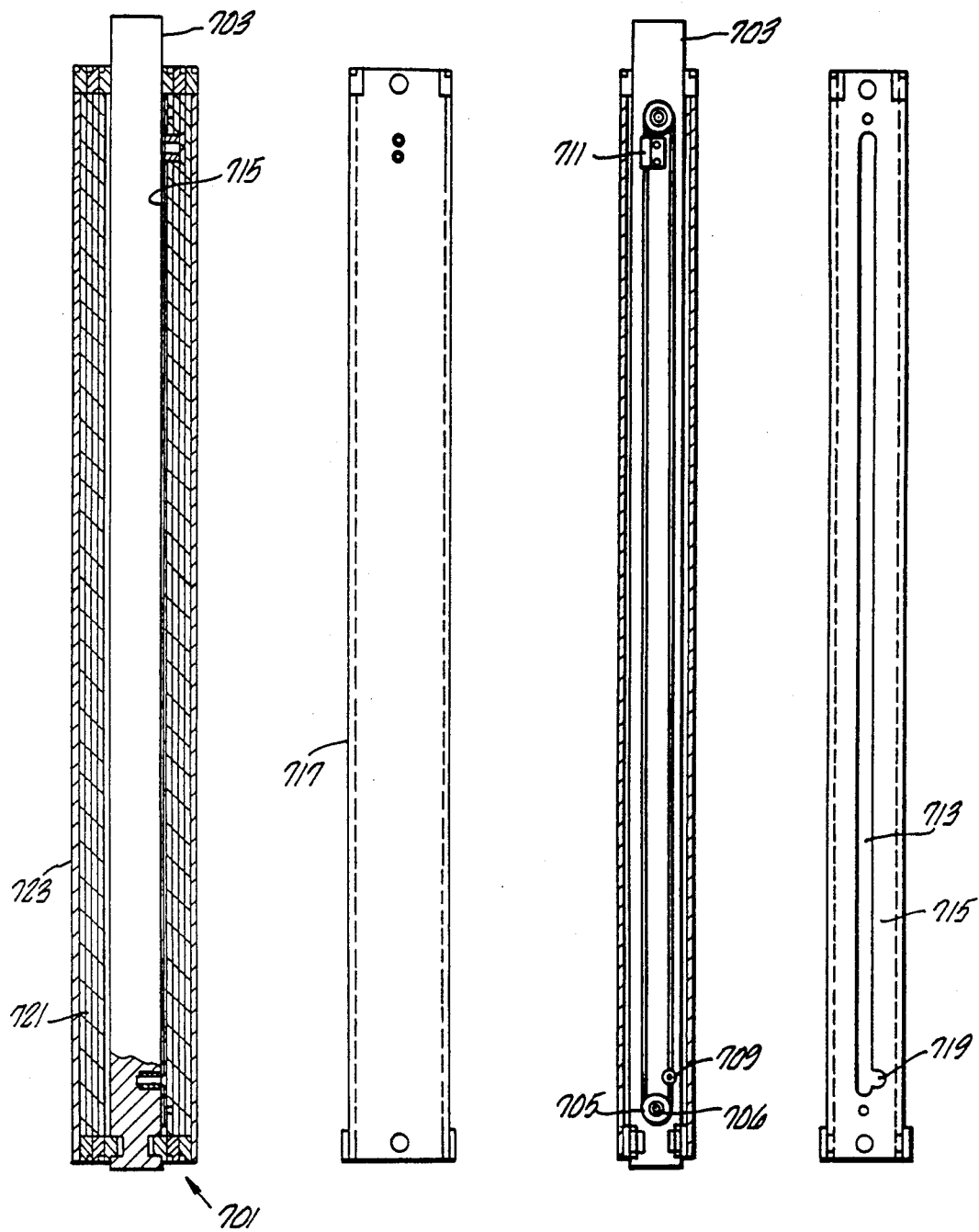
FIG. 12 is a side elevation view of a second embodiment of the telescoping steering drive tube assembly of FIGS. 8 and 9.
FIG. 13 is a side elevation view of a second tube of the assembly of FIG. 12.
FIG. 14 is a side elevation view of the inner shaft thereof.
FIG. 15 is a side elevation view of a first tube of the assembly of FIG. 12.
Figure 16:
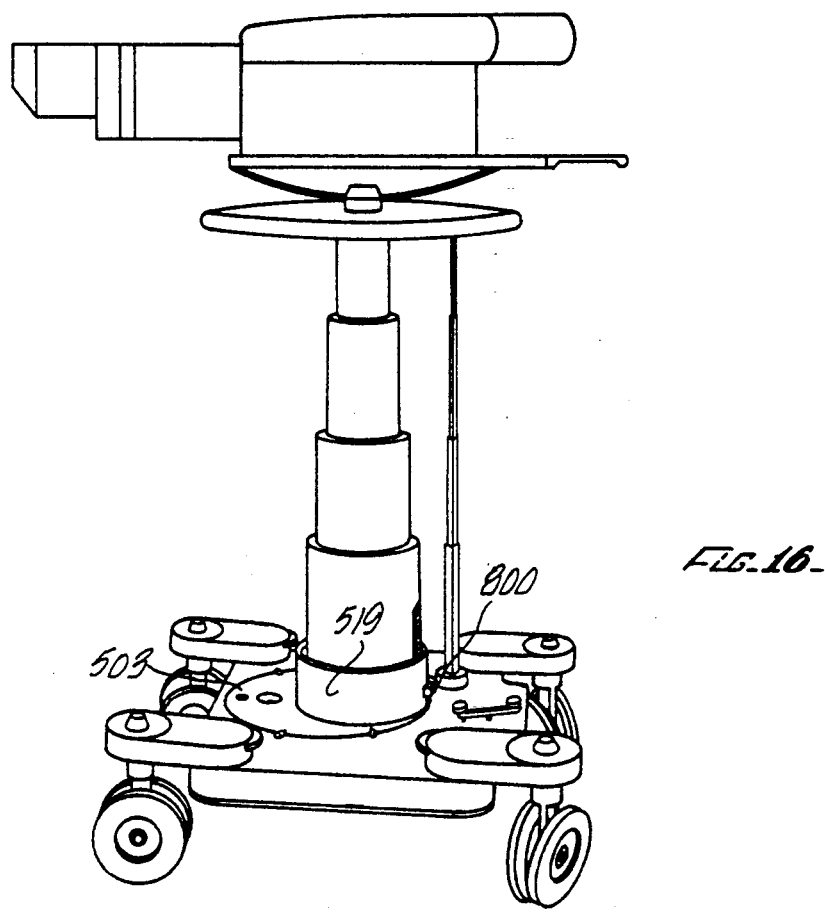
FIG. 16 is a perspective view of the camera dolly with the column in an extended position.

In an alternate embodiment shown in FIG. 12, a cable and pulley system may be used in the telescoping steering drive tube 250 to achieve uniform movement. FIGS. 12, 13, 14 and 15 illustrate an alternate embodiment of the telescoping steering drive tube assembly 205. As shown therein, the drive tube assembly 701 has an inner shaft 703 having pulleys 705 mounted thereto with screws 706 threaded into the inner shaft 703. A cable loop 707 loops around the pulleys 705 and terminates at clamp screw 709, also threaded into the inner shaft 703. Since the lifting forces involved in the telescoping drive tube assembly 701 are on the order of 1.0 lbs., the cable loop 707 may be made of 0.025 diameter fishing line with 40 lb. test. An L-shaped mounting tab 711 is secured to the cable loop 707 adjacent the upper pulley 705 and extends through a travel slot 713 in the first tube 715 (FIG. 15). As shown in FIG. 12, the first tube 715 slides over the inner shaft 703. A second tube 717 slides over the first tube 715 and is attached to the mounting tab 711. An access slot 719 is provided at the bottom of the first tube 715 to provide for installation of the clamp screw 709. As is shown in FIGS. 12-15, if the second tube 717 is considered to be fixed in position, and the inner shaft 703 is lifted, it will lift the first tube 715 at one-half the rate of the inner shaft 703. The configuration illustrated in FIGS. 13-15 is repeated for the third and fourth tubes 721 and 723.

Specifically, to accomplish the desired movement between the first tube 715 and the second and third tubes 717 and 721, a similar pulley and cable loop configuration (as is shown on the inner shaft 703 in FIG. 14) is provided on the first tube 715. Correspondingly, the second tube 717 has a travel slot 713 permitting a mounting tab 711 on a cable loop 707 on the first tube 715 to be connected to the third tube 721. Likewise, this configuration is duplicated once again for the fourth tube 723. In each instance, the pulley and loop arrangement is positioned on a different face of the square tubes to avoid excessive build up in width. A total of three cable loop and pulley sets are used. The assembly shown in FIG. 12 causes the tubes forming the steering drive tube assembly 701 to extend and contract uniformly, in the same manner as the column sections in the column assembly. An improved telescoping column is described in my U.S. patent application Ser. No. 686,823, which is incorporated herein by reference.

The steering tube drive assembly sections 671, 675, 676 and 677 of FIG. 9 may alternatively be mechanically linked to their corresponding column section which will pull up the steering drive tube section, causing the telescoping steering drive 250 to extend in the same manner as the column assembly. The telescoping steering drive 250 and 701 are constructed to extend and contract smoothly, quietly, and with a minimum of force in order to not disturb the quiet and smooth extension of the column assembly.

Figure 8:
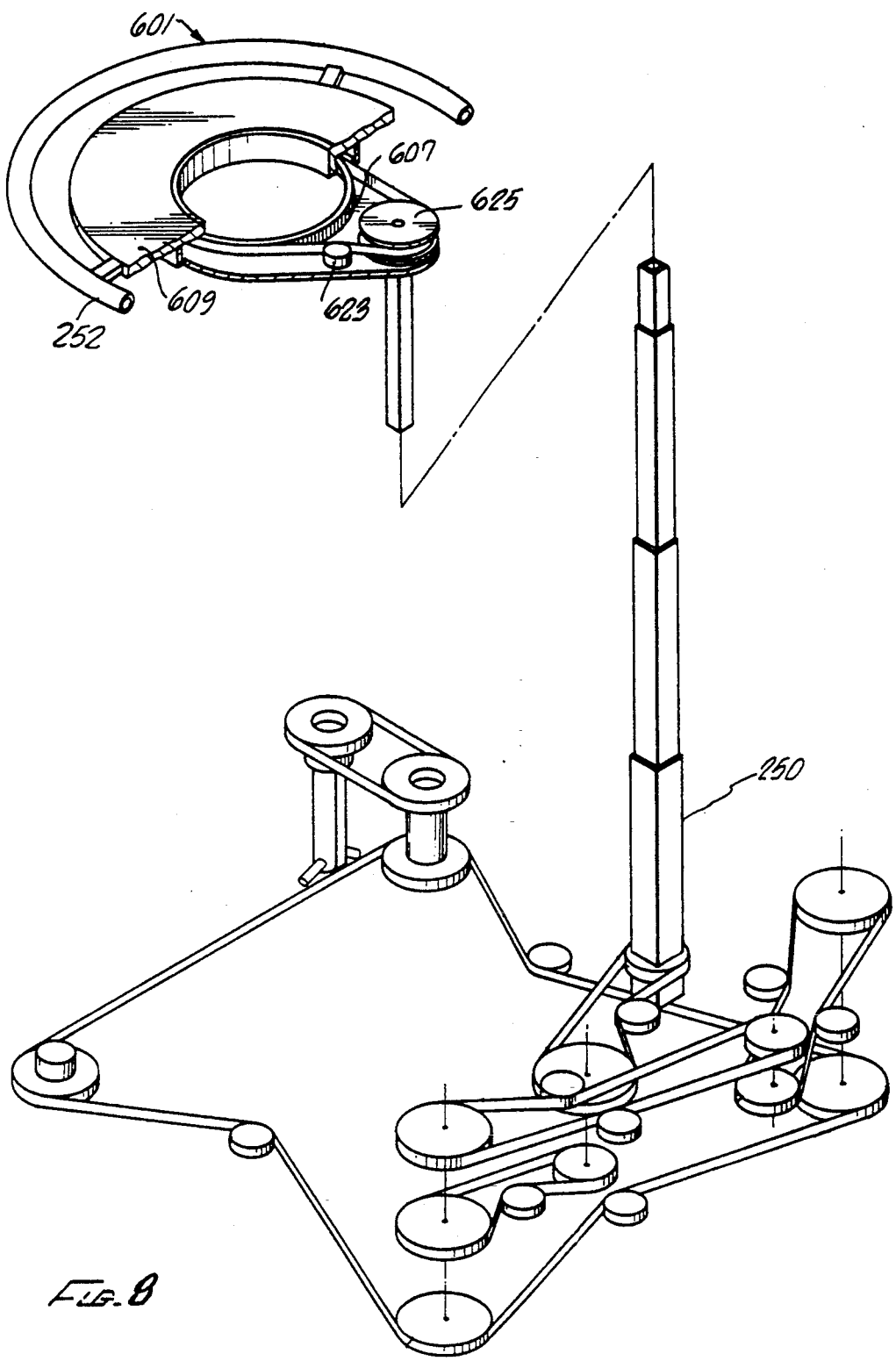
FIG. 8 is a schematic illustration of the steering assembly of the pedestal linked to a dolly steering system.

Turning to FIG. 8, the steering wheel assembly 601 is shown engaged to the steering system of the camera dolly described in the U.S. patent application Ser. No. 591,524 and in U.S. patent application Ser. No. 07/761,178. The base 681 of the steering drive tube 250 extends through and drivably engages a sprocket within the camera dolly, thereby linking the steering assembly 601 of the pedestal to the steering system in the camera dolly. A set screw or similar quick release device secures the inner shaft of the telescoping steering drive tube assembly to the sprocket in the steering wheel assembly 601.

As shown in FIG. 3 a latch assembly 691 is provided on the tank deck. A hook 693 extends downwardly from the lower cover plate 604. With the column assembly fully lowered, the hook engages the spring loaded latch assembly 691 and prevents the column assembly from extending without first releasing the latch assembly 691.

In operation, the camera is attached to the pedestal through the mounting plate 51. Compressed gas, preferably nitrogen, is provided through the delivery tube 511 into the tank volume 506. Sufficient gas is delivered until the pressure acting on the piston 543 causes the column assembly to be urged upwardly with the force counterbalancing the weight of the camera. The column assembly can then be easily raised or lowered, notwithstanding the weight of the camera, by lifting hand action on the steering wheel 252. Additional small weights can be placed on a weight tray 253 (FIG. 3) if desired to aid in counterbalancing. A relief valve 695 prevents overpressurization. A pressure gauge 509 on the tank deck 503 indicates the gas pressure.

Compressed gas is supplied to the tank 506, and it also concurrently flows through the lead tube 511 to the drive chamber 544. Tank 506 and drive chamber 544 are essentially always at the same gas pressure. The gas pressure in the drive chamber exerts a force $F_1$ on the piston 543 cross section. For example, if the gas pressure is 100 p.s.i., and the cross section area of the piston 543 (at the bottom of the stroke as shown in FIG. 4) is 3.976 in$^2$ (i.e., a 2.25 in diameter piston), the force $F_1 = 100$ p.s.i. $\times 3.14$ in$^2 = 398$ lbs. Neglecting friction and column component weight, this 398 lb. force will counterbalance a camera load weight of 398/4 = 99 lbs., since the column assembly has a 1:4 drive ratio.

The tank volume 506 is fixed and is connected to the drive chamber 544 i.e. the volume of the drive cylinder 521 below the piston 543. In addition, after the tank volume 506 is charged with compressed gas, the compressed gas source (e.g. a nitrogen bottle) is removed. As the piston 543 is driven upwardly by Force $F_i$, the volume containing the compressed gas increases. Specifically, the volume of the drive chamber 544 increases. Consequently, the gas pressure drops (as determined by the gas laws) as the piston 543 rises. In conventional pedestals this results in a drop in the counterbalancing force from the bottom to the top of the piston stroke. This variable counterbalancing force makes it very difficult to accurately maintain camera position at a given height.

In the present pedestal, drive cylinder 521 tapers outwardly from bottom to top. As the piston 543 rises, the seal 545 expands radially outwardly effectively increasing the cross section area of the piston on which the compressed gas exerts pressure. Hence, towards the top of the drive cylinder 521, the drop in gas pressure is offset by the increase in "piston" surface area to the extent that product of the gas pressure × surface area and the resulting counterbalancing force is substantially constant. Thus the force $F_1$ is substantially constant throughout the stroke. Therefore, the camera remains properly counterbalanced at all elevations of the pedestal and no "drift" or positioning difficulties are encountered.

As the piston 543 is driven upwardly by the gas pressure, it carries with it the drive rod 548 and the core cylinder 535 which is integral with the entire first column section 527. As this occurs the base 529 of the first column section 527 lifts all of the other column sections 561, 575 and 587. Consequently, the pulleys 547 which are fixed to the column sections move up. The cables 549, 554 and 560 (four on each section) then lift the next inner column section by equal amounts such that the column assembly 500 uniformly extends with all sections moving up by equal relative distance. In absolute terms, the fourth column section 587 extends 4 times the extension of the first column section 527, with the second and third column sections 561 and 575 extending 2 and 3 times thereof, respectively. The tank weldment has an operating maximum pressure of 300 p.s.i. enabling to pedestal to counterbalance up to about 297 lbs.

Since the column support 519 is offset (to the "back") of the tank weldment (FIG. 3), the steering drive sprocket 625 and the steering drive tube 250 can be placed inwardly and away from the steering wheel 252. This allows the operator to grip the steering wheel 252 from various angles or directions without interference from the drive sprocket 625, tube 250 or lower cover plate 604. If the column support 519 were centered in the tank weldment, the drive sprocket 625 would have to be very close the steering wheel 252 and could interfere with the operators grip (for the same size steering wheel).

Figure 10:
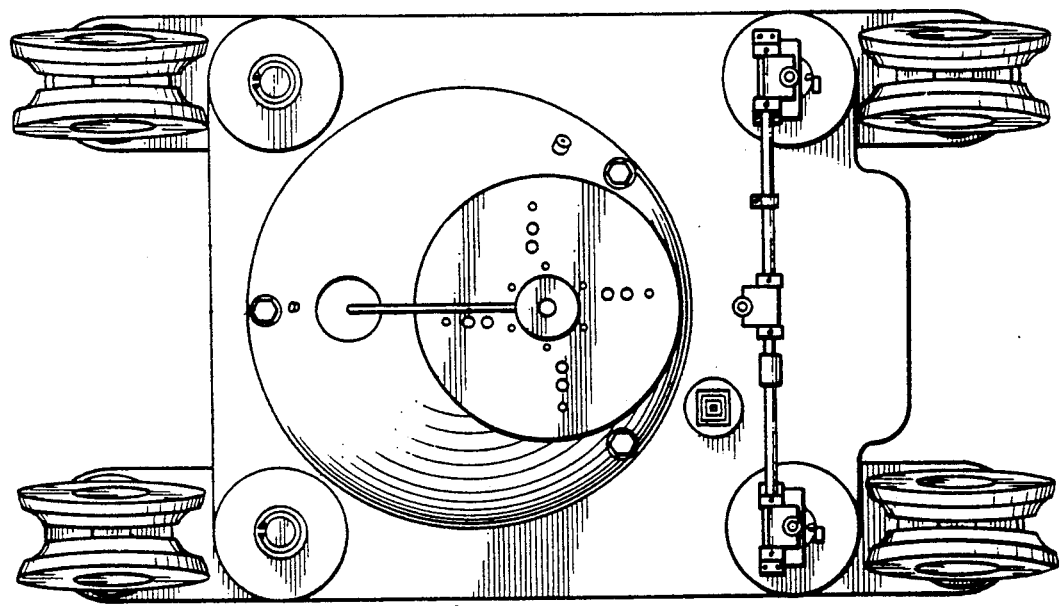
FIG. 10 is a bottom perspective view of the pedestal supported by the dolly.

As shown in FIG. 10, for improved flexibility of use, the pressure gauge is within the tank weldment diameter with the tank weldment made purely round without any protrusion. The round tank weldment can then be rotated to different positions on the camera dolly, allowing the pedestal column to be shifted front to back and side to side by twice the eccentricity of the column on the tank weldment. This feature, for example, allows the camera lens to extend further forward of the dolly, without use of any accessory extension plates.

A column drive system 750 is provided as an accessory. As shown in FIG. 17, the drive system 750 includes a driver unit 752 having an electric motor 754 linked to a gear reduction unit 756 attached to a housing 758. The housing 758 contains a spur gear 760 mounted on a shaft 761 extending from the gear reduction unit 756. The spur gear 760 is engageable into a toothed rack 762 through a rack slot 764 in the column support 519 through actuation of an engager knob 766. The rack preferably comprises teeth with about a 0.062 inch pitch milled into the column section. The engager knob is threaded into the housing 758 to pivot the spur gear into and out of engagement with the rack. A hand knob 768 is provided to manually turn the shaft 761. Power and control wires 770 and 772 run from the drive system 750 to an electronic steering mode shifter accessory 801 (FIG. 1) mounted underneath the dolly. Preferably wires 770 and 772 plug into a connector on the deck of the dolly linked through an internal wiring harness to the shifter 801. The shifter is described in Ser. No. 07/761,168. Control circuitry within the shifter 801 can drive the column between preselected positions, using the drive system.

Since the column is designed to operate in a balanced condition, the drive system need only exert a relatively small force on the rack to raise or lower the column.

Figure 18:
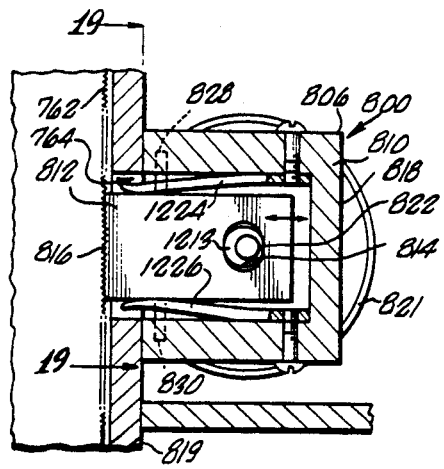
FIG. 18 is an enlarged section view fragment of a column braking system.

To install the drive system accessory 750, the housing 758 is bolted to the support 519, with the gear 760 extending through the rack slot 764 (FIG. 18). The engager knob 766 is turned and pivots shaft 761 and spur gear into the rack for automatic or remote column elevation control. The engager knob 766 is reversed to pivot the spur gear out of the rack for manual (hand) control or initial column load balancing. When the column drive accessory 750 is removed from the column, a cover is placed over the rack slot 764. The rack 762 can be a permanent feature on the column since it does not effect column operation when the drive system is not installed.

A column braking system 800 accessory, as shown in FIG. 18 has a brake unit 806 attached to the outside perimeter of the column support 519 just above the tank plate 503. Control lines run from the brake unit 806 to a brake control switch which may preferably be on the electronic shifter accessory 801, (shown installed in phantom in FIG. 1) and optionally provided on a combination remote hand control unit having a brake switch and a steering mode shift switch. A power supply in the electronic shifter 801 also preferably powers the switches and motor of the braking system 800.

Figure 19:
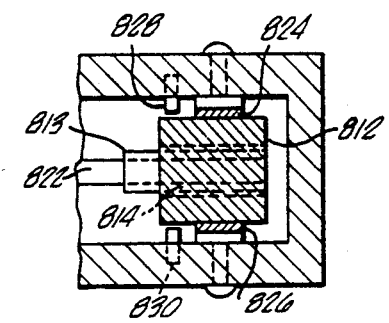
FIG. 19 is a section view taken along line 19—19 of FIG. 18.
Figure 12:
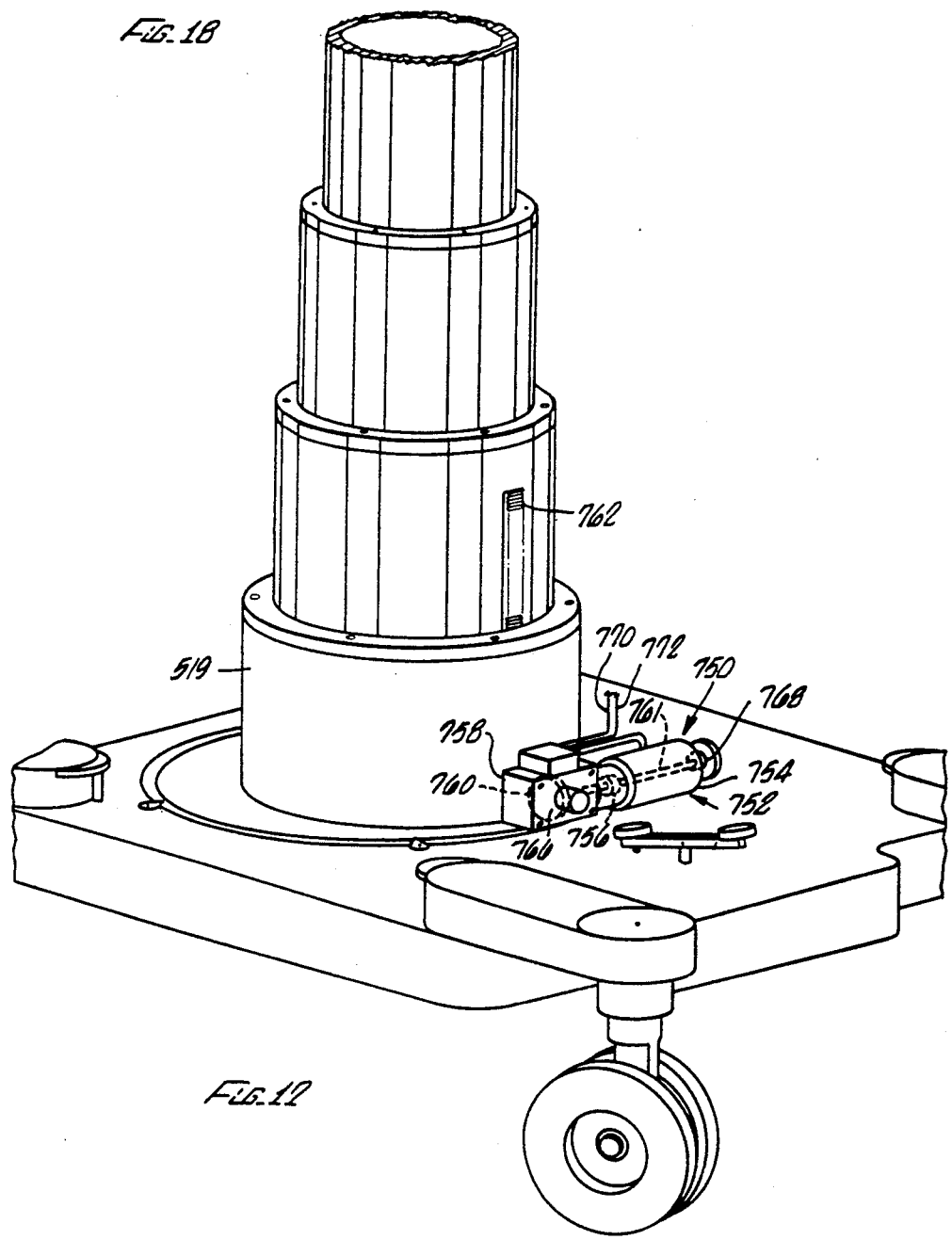

Referring to FIGS. 18 and 19, within the brake unit housing 810 is an engager or dog 812 having a cam slot 814 and a toothed end 816. A cam 813 mounted on a drive shaft 822 of a motor 818 is positioned within the cam slot 814. The cam and slot are dimensioned to preferably provide about 0.070 inch of horizontal movement of a dog having a 0.062 inch rack teeth. Upper and lower leaf springs 824 and 826 provide a slight amount of spring force on the dog 812 to maintain the dog in a centered position when no load is applied to the dog. The centering springs provide sufficient vertical movement of the dog to allow it to shift slightly up or down to align with and engage the teeth on the rack. Upper and lower limit switches 828 and 830 are positioned slightly above and below the nominal center position of the dog 812. A hand knob 821 is attached to the drive shaft 822 to manually engage and disengage the dog. As shown in FIG. 18, the dog 812 extends through the rack slot 764 at the lowest point of the column support 519 above the plate 503.

In operation, with the column in any selected position, the brake unit 806 is actuated by pressing a brake switch on a remote hand control or by using a similar switch on the electronic shifter 801. This causes the motor 822 and cam 813 to turn through an acute angle driving the dog 812 into the rack 804. With the dog engaged into the rack, the first column section 527 can move only as far as the amount of play in the mechanism, e.g., ⅛ of an inch up or down with respect to the column support 519. This effectively locks the column assembly 103 substantially into a fixed position, since all of the telescoping column sections must move together.

If, with the brake system on or engaged (i.e. with the dog 812 engaged to the rack 804) the load on the column assembly 103 becomes unbalanced, the rack 804 will exert an upward or downward force on the dog 812. If, for example, the camera or load on the column assembly 103 is removed and the compensation force from the compressed gas remains, the rack 804 will exert an upward force on the dog 812. Conversely, if the load on the column assembly 103 is increased, or if gas pressure is drawn from the tank 804, the rack 804 will exert a downward force on the dog 830. In either case, the dog will move sufficiently against the centering springs to actuate either the upper or lower limit switch 828 or 830. Actuation of either limit switch will cut power to and prevent any movement by the motor 822, so that the column assembly will remain locked in position (notwithstanding contrary signals from the remote brake switch or the panel mounted brake switch 808), until the imbalance is removed.

The brake system 800 is advantageously provided as an accessory to the pedestal 101, allowing the column assembly 103 to be braked or locked at any position. It can also be used to achieve preset amounts of column extension, for example, by providing a scale alongside the rack 804. Although various rack and dog configurations may be acceptable, since the column may exert forces of up to, for example, 250 pounds, a positive tooth engagement between the dog and rack is preferred over designs relying exclusively on friction. If the brake system 800 is used, the latch 691 (FIG. 3) is not necessary, since the brake system 800 can positively lock the column assembly 103 into the completely collapsed position (as does the latch 691) as well as any other position of intermediate or full extension. Although the column support 519 in this instance is immovable, it may be considered as a first column segment and the first column section 527 considered as a second column segment.

Thus, while several embodiments have been shown and described, it will be obvious to those skilled in the art that various alterations and additions may be made to the apparatus without deviating from the spirit and scope of the invention.

I claim:

1. A camera support comprising:
 a dolly having a chassis including a pedestal receptacle, a pair of front legs and a pair of rear legs pivotally attached to the chassis, and ground wheels attached to each of the legs;

a steering system on the chassis for steering the wheels, on at least one of the front and rear pairs of legs;

a pedestal having a compressed gas tank and a telescoping pedestal column joined adjacent to one side of the tank, with the pedestal supportable in and removable from the pedestal receptacle;

a telescoping steering drive tube extending from the pedestal to the steering system; and a steering wheel rotatably attached to the pedestal column and linked to the steering system.

2. The camera support of claim 1 wherein the gas tank and chassis have generally flat upper deck surfaces which are approximately co-planar when the pedestal is mounted in the pedestal receptacle.

3. The camera support of claim 1 further comprising:

a steering wheel sprocket having a first diameter attached to the steering wheel;

a steering drive sprocket, having a second diameter less than the first diameter, attached to the telescoping steering drive tube; and a belt connecting the steering wheel sprocket and the steering drive sprocket.

4. The camera support of claim 1 wherein the steering drive test tube is extendible through the chassis of the dolly.

5. The camera support of claim 1 wherein the steering system in the dolly comprises toothed belts and sprockets.

6. The camera support of claim 1 wherein the pedestal generates lifting force entirely pneumatically.

7. A camera support comprising:

a dolly having a chassis including a pedestal receptacle, a plurality of legs pivotally attached to the chassis, and wheels attached to the legs; and a pedestal having a compressed gas tank protruding through the chassis of the dolly and a telescoping pedestal column joined adjacent to tone side of the tank, with the pedestal supportable in and removable from the pedestal receptacle.

8. A camera support comprising:

a dolly having a chassis including a pedestal receptacle, a plurality of legs pivotally attached to the chassis, and wheels attached to the legs; and a pedestal having a compressed gas tank including adjustable length legs and a telescoping pedestal column joined adjacent to one side of the tank, with the pedestal supportable in and removable from the pedestal receptacle.

* * * * *